United States Patent [19]

Eichberger et al.

[11] Patent Number: 4,783,287

[45] Date of Patent: Nov. 8, 1988

[54] METHOD FOR THE CONTINUOUS PRODUCTION OF FOAM MATERIAL

[75] Inventors: Walter Eichberger, Perchtoldsdorf; William Valenta; Heinz Stampfer, both of Maria Enzersdorf, all of Austria

[73] Assignee: Isovolta Osterreichische Isolierstoffwerke Aktiengesellschaft, Wiener Neudorf, Austria

[21] Appl. No.: 939,046

[22] Filed: Dec. 8, 1986

Related U.S. Application Data

[63] Continuation of Ser. No. 673,743, Oct. 9, 1984.

[30] Foreign Application Priority Data

Nov. 2, 1983 [AT] Austria ................................. 470/83

[51] Int. Cl.⁴ ..................... B29C 65/04; B29C 39/12; C08G 8/10; C08J 9/06
[52] U.S. Cl. ................................. 264/26; 264/46.2; 264/46.3; 264/54; 264/261; 264/DIG. 2; 425/115; 425/174.8 E; 425/224; 425/817 C
[58] Field of Search ................. 264/25, 26, 46.2, 46.3, 264/DIG. 2, 54, 261; 425/115, 174.8 E, 224, 817 C

[56] References Cited

U.S. PATENT DOCUMENTS

| | | |
|---|---|---|
| 2,945,261 | 7/1960 | Aykanian et al. |
| 2,993,871 | 7/1961 | Shannon et al. ............... 264/46.2 X |
| 3,081,269 | 3/1963 | Shannon et al. ............... 264/46.2 X |
| 3,243,484 | 3/1966 | Immel ................................. 264/48 |
| 3,764,247 | 10/1973 | Garrett et al. ............... 264/DIG. 2 |
| 3,821,337 | 6/1974 | Bunclark et al. ..................... 264/26 |
| 3,863,908 | 2/1975 | Charpentier ..................... 264/45.5 |
| 4,187,066 | 2/1980 | Hobson et al. ............... 264/DIG. 2 |
| 4,332,754 | 6/1982 | Meunier et al. ............... 264/DIG. 2 |
| 4,375,441 | 3/1983 | Adams et al. ..................... 264/26 X |

FOREIGN PATENT DOCUMENTS

| | | |
|---|---|---|
| 588617 | 5/1947 | United Kingdom . |
| 1098471 | 10/1964 | United Kingdom . |
| 1116349 | 6/1968 | United Kingdom . |
| 1221481 | 3/1971 | United Kingdom . |

OTHER PUBLICATIONS

Moiseyev, A. A., V. V. Pavlov and M. Ya. Borodin, Edts., translated from the Russian by E. J. Hazzard, translation edt. by Leslie N. Phillips, *Expanded Plastics, A Collection of Papers,* New York, The MacMillan Co., 1963, pp. 85-109 (a Pergamon Press book).

Brydson, J. A., *Plastics Materials,* Princeton, N.J., D. Van Nostrand, ©1966, pp. 379-406.

*Primary Examiner*—Philip Anderson
*Attorney, Agent, or Firm*—Bierman & Muserlian

[57] ABSTRACT

A method for the continuous production of foam materials, wherein the foaming and/or foamed synthetic starting material is passed through the pressure zone (4) of a continuously operating press (1), and in which method at least a part of the heat required for foaming is produced in the synthetic starting material itself as dielectric heat of an electromagnetic high-frequency condenser field, wherein production of this heat in the starting material takes place at least to its greatest part within a high-frequency condenser field which is arranged in the direction of passage (8) of the material through the press (1) in front of the pressure zone (4), and that in order to supply additional heat into the foaming and/or foamed starting material or in order to prevent or delay its surface cooling, at least one of the electrodes (10, 11) between which prevails the high-frequency field and/or at least one of the pressure surfaces of the press may be heated.

8 Claims, 1 Drawing Sheet

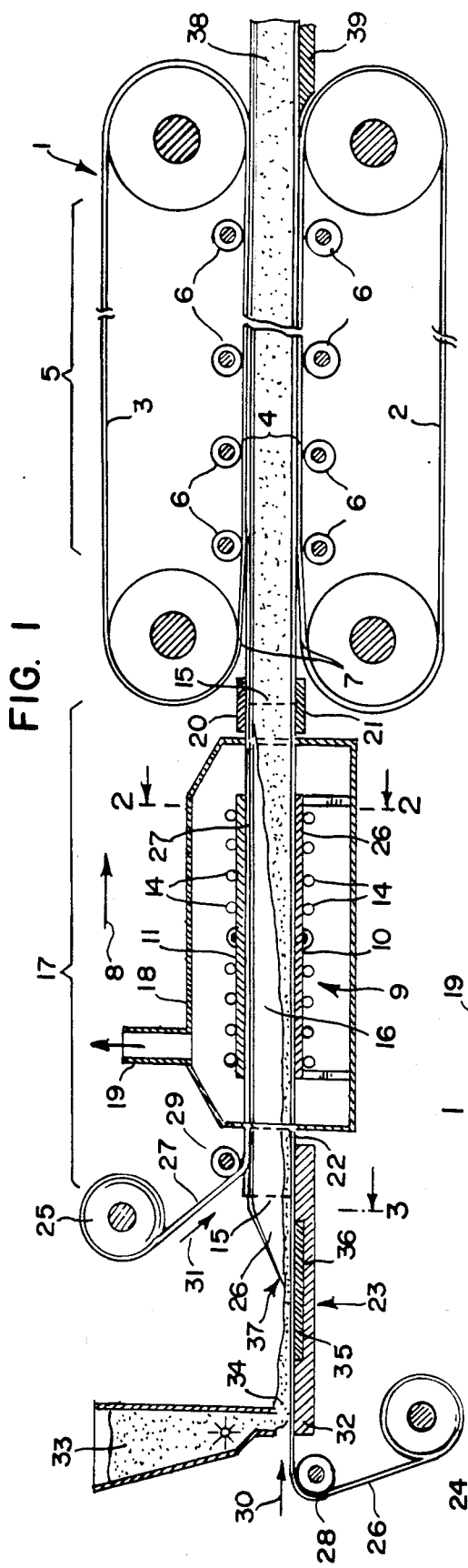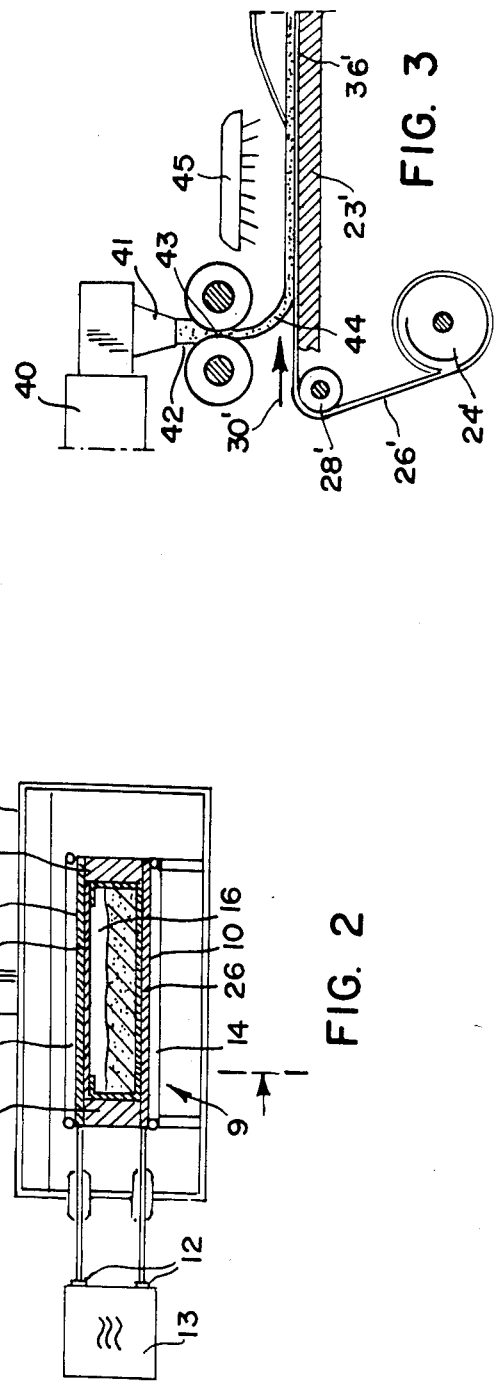

METHOD FOR THE CONTINUOUS PRODUCTION OF FOAM MATERIAL

This is a continuation, of Ser. No. 673,743 filed Oct. 9, 1984, now abandoned

TECHNICAL DOMAIN

The invention concerns a method for the continuous production of foam material, in which the foaming and/or foamed synthetic starting product is conducted through the pressure zone of a continuously operating press, and in which at least a part of the heat required for foaming is produced in the synthetic starting product itself as dielectric heat of an electromagnetic high-frequency condenser field.

STATE OF THE ART

The aforementioned method can be carried through, e.g., with the aid of the device described in British Pat. No. 588,617. This known device, essentially constructed as a band press, has an endless lower pressure band of metal, as well as several upper pressure bands arranged one after another and at a distance above the lower pressure band in the direction of the flow of the material to be pressed, wherein said latter pressure bands are in the shape of jointed bands. While the lower pressure band is grounded electrically, high-frequency voltages are supplied to the upper pressure bands, so that an electromagnetic high-frequency condenser field will prevail in the gaps between the lower pressure band and the upper pressure bands.

For the continuous production of foam material, the synthetic starting material containing a foaming agent is fed continuously into the entrance to this device, is then conveyed through the device by the lower pressure band and in the course of this is heated up, so that it foams up against the upper pressure bands. When a thermosetting starting material is used, the foam so produced is hardened into the desired foam product during its further passage through the device.

The device described above, which approximately represents a multiple band press with high-frequency heating of the substance to be pressed, is of a relatively complicated design. The applicant assumed that not least for this reason, the production of foam materials using high-frequency heating to foam the starting material has not become established in practice.

DESCRIPTION OF THE INVENTION

It is the underlying task of the invention to report a method for the continuous production of foam materials, in which the foaming and/or foamed synthetic starting material is passed through the pressure zone of a continuously operating press, and in which at least a part of the heat required for foaming is produced in the synthetic starting material itself as dielectric heat of an electromagnetic high-frequency condenser field, wherein according to the invention the method is to be practicable with the aid of a simpler device than heretofore.

The underlying task of the invention is solved in that the production of this high-frequency heat in the starting material takes place, for the most part at least, in a high-frequency condenser field arranged in front of the pressure zone, in the direction in which the material passes through the press, and that for the purpose of supplying additional heat to the foaming and/or foamed starting material or for the purpose of preventing or delaying cooling of the surface of same, at least one of the electrodes between which the high-frequency field prevails, and/or at least one of the pressure surfaces of the press may possibly be heated. The starting material can then advantageously be supplied to the high-frequency field in a preheated state, wherein this preheating can in an advantageous manner be effected at least partially through infrared radiation.

According to the advantageous constructions of the method according to the invention, the starting material can be fed to the high-frequency condenser field in the form of a melt or as a powder and/or granulate.

In a further advantageous embodiment of the invention, the starting material foaming in the high-frequency condenser field is fed within a sheath of laminar material to the pressure zone of the continuously operating press. The starting material can then also be fed advantageously to the high-frequency field when already within such a sheath.

According to another advantageous embodiment of the method according to the invention, the starting material is applied in the form of a pasty mass produced through mixing and heating, wherein the mixing and heating can advantageously take place in an extruder and, according to an advantageous variant, the pasty mass is converted continuously—preferably with the aid of a calender—into a layer of starting material.

According to a last advantageous embodiment of the invention, the method according to the invention is characterized therein that a starting material based on a thermosetting synthetic material is used. For the production of phenolic aldehyde foam products a starting material is then used which contains a Novolak, an aldehyde donor, a foaming agent and a catalyst.

DESCRIPTION OF THE DRAWINGS

The method according to the invention is here described in greater detail with the aid of the drawings. In schematic representation:

FIG. 1 shows an advantageous device for implementing the method according to the invention, in a section along line I—I in FIG. 2;

FIG. 2 shows a cross section of the device according to FIG. 1 along the line II—II in FIG. 1, and FIG. 3 shows a partial view of a variant of the device according to FIG. 1, in section.

The device according to FIG. 1 consists of a band press 1 with two heatable continuous pressure bands 2 and 3 which enclose a press-gap 5 above a pressure zone 4. Within this pressure zone 4, the pressing effect is transferred to the pressure bands 2 and 3, respectively, by way of the press wheels 6, in the manner known per se. The bank press 1 conveys the material fed to it at the press-gap entrance 7 in the flow direction 8. In the flow direction 8, in front of the press-gap entrance 7, a high frequency heating unit 9 is arranged, which is equipped with plate-shaped electrodes 10 and 11 that are connected to the outlet 12 of a high-frequency generator 13 (FIG. 2). The two electrodes 10 and 11—which are heatable independently with the aid of heating coils 14—are kept apart by two border strips 15 made of electrically insulating material with a low dielectric loss factor, so that the two electrodes 10 and 11 and the two border strips 15 define a heating tunnel 16 with a rectangular section serving to permit the passage of the material to be heated. The border strips 15 extend beyond the length of the electrodes 10, 11 over the zone 17, and within the limits of band press 1 they are continued by lateral border strips of steel (not shown in the figures), which laterally delimit the press-gap 5. The high-frequency heating unit 9 additionally has an electric shield 18 which has a drain 19. To bridge the space between the high-frequency heating unit 9 and the press-gap entrance 7 two heatable guide-shoes 20 and 21 are provided arranged in alignment with the pressure surfaces of band press 1.

In front of the entrance 22 of the high-frequency heating unit 9, a feeding table 23 is arranged as well as delivery spools 24 and 25 to accept the lengths of sheathing material 26 and 27, respectively, which are drawn off over the guide rollers 28 and 29, respectively, in the direction of the arrows 30 and 31, respectively. A scattering device 33 is arranged at the beginning 32 of feeding table 23, serving to assure the quantitatively regulated, continuous application of a powdery synthetic starting material 34 unto the sheathing material 26, which latter, sliding on the feeding table 23, is drawn off in the direction of arrow 30. A heating plate 35 embedded in the feeding table 23 serves to preheat the synthetic starting material 34 prior to its entering the high-frequency heating unit 9.

To produce a foam product by means of the device described with the aid of FIGS. 1 and 2, the powdery starting material 34 which contains a foaming agent and which starting material could advantageously be one on the basis of, e.g., a thermosetting synthetic, is spread continuously and in a quantitatively regulated manner with the aid of the scattering device 33 unto the lower sheathing material 26 made of, e.g., soda kraft paper, moving in the direction of arrow 30. The spread layer of starting material is subsequently converted into a layer-shaped melt 36 through the supply of heat from heating plate 35, at a temperature that is below the foaming temperature of the starting material 34. Shortly after the starting material is spread on, the lower web 26 of sheathing material, with the aid of a customary device not shown in the figures, will—as indicated at 37—be continuously folded at both edges, initially vertically upwards and then, at the top side of the plate-shaped foam product to be produced, it is again folded over to the horizontal at both edges with two edge-strips, so that for the lower web 26 of sheathing material the form is obtained as is shown in FIG. 2. This upwards folded sheathing material web 26 carrying the starting material melt 36 is then fed continuously, together with the upper sheathing material web 27, which may also consist of soda kraft paper, to entrance 22 of the high-frequency heating unit 9, with the upper sheathing material web 27 being passed through the heating tunnel 16 in a taut condition in such a manner that it will glide along the bottom side of the upper electrode 11.

Inside the heating tunnel 16, an electromagnetic high-frequency condenser field prevails, which produces dielectric heat in the starting material melt 36 transported through the heating tunnel 16, leading to a rapid and uniform rise of the temperature in the starting material which foams in a wedge-like manner. With some starting materials this rise of temperature can be speeded up further through the exothermicity of the beginning setting reaction. By heating the electrodes 10 and 11, a superficial heat loss from the foaming material is avoided.

The high-frequency voltage and the transit speed of the material through the device are adjusted to each other in such a manner that the foaming material will first completely fill the sheath formed by the two sheathing material webs at a spot situated approximately between the two heated guide-shoes 20 and 21, respectively, and the pressure gap entrance 7. So long as the material foaming up against this sheath is still soft, it exerts only slight pressure on the inner surface of the sheath, which pressure is transferred through the flexible sheathing material webs 26, 27 to the fixed surfaces serving to guide the sheath, e.g., to the surfaces of the heated guide shoes 20 and 21, respectively. Due to this only light contact pressure, a gliding of the sheath along its fixed guide surfaces is hardly interfered with, however.

The sheath filled with still soft foamed material now passes the pressure zone 4 of the band press, in which the internal pressure of the foam rises initially and the foam subsequently sets to a synthetic foam substance. The heated guide shoes 20, 21 and the heated pressure bands 2, 3 prevent or at least delay a surface cooling of the synthetic foam towards the end of the foaming stage and/or during the setting. The finished hardened foam substance 38 finally emerges at the exit of band press 1 and is removed on the table shown at 39; it is subsequently trimmed at the edges at divided into individual pieces.

FIG. 3 shows a variant of the device according to FIG. 1 with a modified starting material feeder. The device part represented by line III in FIG. 1, left, is replaced in this variant by the device part shown in FIG. 3.

In this variant, the starting material, e.g., in powdered form, is mixed and heated in an extruder, the extrusion head of which is indicated as 40 in FIG. 3, and is then extruded through nozzle 41 in the form of a pasty strand 42. This strand 42 is then shaped in a calender roll slit 43 into a strip 44 of uniform thickness, and then continuously fed into a lower sheathing material web 26' which—drawn from a supply spool 24' over a guide roller 28'—is moved gliding on a feeder table 23' in the direction of arrow 30'. An infrared radiation source is provided above the feeder table 23', which converts the strip-shaped pasty starting material into a layer-shaped melt 36', which subsequently—analogous to FIG. 1—serves as starting material for the production of the foam product.

The method according to the invention now has the essential advantage that with it the zone, in which the high-frequency energy is supplied, and the pressure zone 4, in which the foam under build-up of a counter-pressure foams up against the pressure surfaces and in which it may possibly set, are spatially separated from each other, and thereby the carrying through of the method is made sufficiently possible with a relatively simple device which may consist of common, relatively simply constructed device parts.

BEST WAY FOR THE REALIZATION OF THE INVENTION

The method according to the invention is particularly suitable for the production of synthetic foam products, in which no exothermic reactions take place in the starting material during foaming, or the exothermicity of such reaction is too low to supply a substantial part of the heat required for foaming.

It is known that for the production of phenol-formaldehyde foams one starts with a single stage resin, with the setting having to take place under heavily acid condition. With this resin system the setting reaction is so strongly exothermic that the foaming does not create any problems. The acid contained in this system can no longer be removed from the finished foam, so that the surfaces of the finished foam plates are corrosive, which must be considered a limitation in their use. Moreover, these foams have the disadvantage that during their production relatively large quantities of water must be removed from the foaming and setting substance. This is probably one reason that in such foams a high percentage of closed pores cannot be achieved or can be achieved with great difficulty only.

Phenol-formadehyde resin foam system have been known for the past few years in the production of which a starting material is used that contains Novolak, hexamethylenetetramine and a foaming agent, with setting being slightly basic. During the heating of the starting material, hexamethylenetetramine disintegrates into formaldehyde and ammonia, with the latter serving partly as a catalyst, partly as a gaseous foaming agent. Such a system has been described, e.g., in U.S. Pat. No. 3,081,269. Because of the anhydrous starting material, essentially only the quantities of water released during the condensation reaction need be removed during foaming and setting, whereby it is mostly not too difficult to obtain a high percentage of closed pores in such foams based on Novolak.

However, a disadvantage in the production of such foams on a Novolak Lasis is that the exothermicity during the setting reaction is not sufficient to harden the foam without an additional supply of heat. Yet because of the low thermal conductivity of the foam, it can be supplied heat after foaming at a very slow speed only, leading to relatively long setting times, which in many cases stands in the way of economical production. This advantage is avoided with the method according to the invention.

Described below is the preferred technique of the method according to the invention for the continuous production of phenolic aldehyde foam products, with the aid of the method illustrated by means of FIGS. 1 and 2.

As starting materials,
1000 parts by weight Novolak-Wetting Agent mixture
150 parts by weight hexamethylenetetramine as formaldehyde donor
50 parts by weight azo-isobutyronitrile as foaming agent, and
150 parts by weight aluminum hydroxide as filler
all in powdered form with particle sizes smaller than 0.25 mm are uniformly mixed together and fed to the spreading device 33.

To produce the foam product, the powdered starting material is spread with the aid of the spreading device 33, while the band press is running, in a uniform layer onto the kraft paper web serving as lower sheathing material web 26, and this layer is converted into a melt 36 through heat absorption from heating plate 35, which melt then has temperatures between 90° and 100° C. After the lower sheathing material web is folded up and an additional kraft paper web serving as upper sheathing material web 27 having been supplied, the melt 36 is heated in heating tunnel 16 in the electromagnetic high-frequency condenser field prevailing between the electrodes 10 and 11, in the course of which the hexamethylenetetramine disintegrates into formaldehyde and ammonia, and the azo-isobutyronitrile disintegrates into its gaseous, decomposition products, whereby the material foams with gradual rising in a wedge-shaped manner as it moves with the web and finally attains a temperature between 150° and 165° C. By supplying heat from the electrodes 10, 11 which are constantly kept at a temperature between 150° and 165° C., the heating of the foaming material is supported further, even if only to a slight extent.

By keeping the heated guide-shoes 20, 21 as well as the pressure bands 2, 3 of the band press 1 at the same temperature between 150° and 165° C. as well, it is achieved that the foaming and/or subsequently foamed material retains the approximately same optimal setting temperature over its entire cross section during setting while passing through the band press 1.

In an advantageous production example, phenol-formaldehyde foam plates, 5 cm thick and with a volumetric weight of 30 kg/m$^3$ is produced under the following manufacturing conditions:

High-frequency voltage: 4 kV at 13.56 MHz
Electrode gap: 5 cm
Electrode length: 1.20 m
Length of pressure zone 4: 6.0 m
Rate of feed of material through the band press: 1 m/min.

The variant of the method described with the aid of FIG. 3 has the advantage that it does not work with an easily dusting powder mixture as starting material, in which there often obtains the risk of separation. The variant of the method has the advantage, especially also when a starting material containing a Novolak-wetting agent compound is used, that this compound, which must be prepared separately, need not be ground to a specific grain size and that the grain sizes and/or the grain-size distributions of the other components of the starting material are not very critical.

Commercial Usability

Through the method according to the invention, the continuous production of synthetic foam products, which are used particularly as thermal insulating materials, is substantially simplified in comparison with known methods.

We claim:

1. A method for the continuous production of foam materials comprising feeding a layer of starting material containing a novolac, an aldehyde donor, a foaming agent and a catalyst within a sheath of flat material having spaced upper and lower walls, then heating the layer with dielectric heat by conveying said layer within said sheath through an electromagnetic high frequency condenser field produced between plate-shaped electrodes to effect a gradual rising wedge-like foaming of the layer as it passes between the electrodes and then passing the foamed layer within said sheath through a pressure zone defined by pressure bands of a continuous press without an electromagnetic high frequency field, wherein any additional heat which is required for the foaming and to prevent or delay surface cooling of the foaming and foamed layer, is supplied by heating of at least one of the said electrodes and at least one of the pressure surfaces of the press.

2. A method according to claim 1, wherein the starting material is fed to the high-frequency condenser field in a preheated state.

3. A method according to claim 2, wherein the preheating is effected at least partially by infrared radiation.

4. A method according to claim 2 or 3, wherein the starting material is fed to the high-frequency condenser field in the form of a melt (36, 36').

5. A method according to claim 2 or 3, wherein the starting material is fed to the high-frequency condenser field in the form of a powder and/or granulate.

6. A method according to claim 1, wherein the starting material is provided in the form of a pasty substance produced through mixing and heating.

7. A method according to claim 6, wherein the mixing and heating of the starting material takes place in an extruder.

8. A method according to claim 7, wherein the mixed and heated starting material is extruded as a pasty strand which is converted continuously into a layer of starting material with the aid of a calender.

* * * * *